United States Patent [19]

Miyoshi et al.

[11] 4,032,968
[45] June 28, 1977

[54] TELEVISION IMAGE PROJECTING SYSTEM

[75] Inventors: Keisuke Miyoshi, Katano; Toshitaka Yukumoto, Ibaragi, both of Japan

[73] Assignee: Matsushita Electric Industrial Co., Ltd., Kadoma, Japan

[22] Filed: Nov. 3, 1975

[21] Appl. No.: 628,347

[30] Foreign Application Priority Data

| Nov. 14, 1974 | Japan | 49-131698 |
| Nov. 14, 1974 | Japan | 49-131699 |
| Dec. 19, 1974 | Japan | 49-147353 |
| Dec. 19, 1974 | Japan | 49-147354 |
| Dec. 19, 1974 | Japan | 49-147355 |
| Dec. 19, 1974 | Japan | 49-147356 |
| Dec. 19, 1974 | Japan | 49-147357 |
| Dec. 19, 1974 | Japan | 49-147358 |
| Dec. 19, 1974 | Japan | 49-147359 |

[52] U.S. Cl. .......................... 358/60; 358/239
[51] Int. Cl.² ........................................ H04N 9/31
[58] Field of Search ......... 358/60; 178/7.5 D, 7.88; 313/474, 478

[56] References Cited

UNITED STATES PATENTS

| 2,598,941 | 6/1952 | Roth | 358/60 |
| 2,960,615 | 11/1960 | Harries | 178/7.88 X |

*Primary Examiner*—Howard W. Britton
*Assistant Examiner*—Mitchell Saffian
*Attorney, Agent, or Firm*—Stevens, Davis, Miller & Mosher

[57] ABSTRACT

A television image projecting system for projecting a television image on a screen at a magnified scale includes a plurality of projector systems of different colors sealed in one cathode ray tube. Electron beams of the projector systems are simultaneously deflected by a common deflecting device and spherical reflecting mirrors of the projecting systems are disposed closely to each other to partially overlap each other, and the overlapped portions are removed. The plurality of projector systems are in-line arranged, whereby color-stability and color balance over a wide range are attained.

20 Claims, 42 Drawing Figures

TELEVISION IMAGE PROJECTING SYSTEM

The present invention relates to a projecting system for projecting a television image on a screen, and more particularly to such a projecting system having a high color stability.

The color television image projecting systems of the prior art can be classified into (1) a system in which an image on a color CRT is directly projected by an optical system on to a screen, (2) three primary color images, i.e., red, green and blue images are separately projected by the three projectors and combined on a screen to produce a color image, and (3) a light valve system (in which case, in the past, three primary color projection by three idofalls in a manner as described in (2) above was carried out although a single light valve which can be produce a color image has been commercially available).

Of the above classification, in the system (1) in which the image on the color CRT is directly projected, the entire system can be very simple and, since the color image produced on the CRT screen is directly projected, the color stability of the projected image is as high as that of a direct viewing color TV set so that a well stabilized color image is assured. On the other hand, a problem encountered in the system is that because switching of three primary colors is effected on the phosphor screen of the CRT the resolution power of the image per se is low and color dots or stripes become objectionable when the image is projected at a magnified scale resulting in a low quality of image. Further, in a color CRT, a color switching grid or mask is provided therein so that the permeability of the electron beam at that portion is low (in the order of 15 − 20%) and most of the high voltage power applied to the CRT is not dissipated at the phosphor screen but at the color switching portion. Thus, as the high voltage power is increased to raise the image brightness on the CRT screen, the power dissipation at the color switching portion proportionally increases, resulting in doming and having an adverse affect on the image quality. Therefore, this system includes drawbacks in that high brightness on the CRT screen is not attained and the brightness of the projected image is also not sufficiently high.

However, if a directional projecting screen is used (indeed, an aluminum foil screen having a horizontal scatter angle of approximately 20°, a vertical scatter angle of approximately 9°, and a gain of approximately 15 has been commerically available), a projecting system having an image brightness which enables a viewer to watch the image without significant difficulty in a dark room can be provided although, the service area is restricted. Further, since the color image is projected through one optical system no factor of deteriorating the image quality is included other than the change in the image brightness with changes in viewing position. In the light valve system, sufficiently high brightness and large screen size may be attained but the system must be of extremely large scale and expensive and hence it is not considered to be applicable to home entertainment use.

The type (2) color television image projecting system described above is somewhat complex in construction as compared with the type (1) described above, but since each of the three projectors thereof projects only one selected primary color image the color switching portion in the color CRT need not to be used so that the image of a very high resolution can be produced. Furthermore, since there is no absorption of an electron beam at the color switching portion the phosphor screen can be driven in a very efficient manner so that a primary color image of high brightness can be produced. Thus, compared with the system (1), the system (2) above can produce a projected image having much higher brightness and resolution power.

A problem encountered in this system, however, is that since deflection coils for red, green and blue projectors are separate there exists non-uniformity in the variation of the deflection constant due to the change in ambient temperature so that the color disturbance occurs because the amplitude linearities for red, green and blue change in different manner. It is very difficult to completely compensate for such color disturbance. As a result, to compare with the system in which a color CRT having a single deflection coil is used to produce a color image, the stability to the color disturbance in the system (2) above is very low. This is a very big factor which has prevented the development of the projecting type color TV compared with the direct viewing color TV. Moreover, since the respective projecting optical axes are different from each other, keystone distortion occurs, which must be electrically compensated. This compensation is similar to a convergence compensation in a direct viewing color TV and requires a high stability because the variation in an electrical compensation circuit leads to color disturbance.

Further, when the red, green and blue images are projected by separate projectors, the principal axes of the red, green and blue reflected lights from the screen (or transmitted lights when a transmitting typr screen is used) are different from color to color. As a result there occurs a problem in that the type balance changes from one viewing point to another viewing point, which problem is undesirable in the color television image projecting system. To avoid the above problem, the grain of the screen is usually reduced to approximately 5 − 15 or th images of the respective colors synthesized before they are projected on the screen. In any event, the brightness of the projected image is in the order 5 − 20 ft-L, which is insufficient for viewing in a lighted room. This has also been a factor in preventing the development of the color television image projecting system. Although a horizontal incident angle can be somewhat reduced by a delta arrangement of the projectors, this arrangement results in the difference in the vertical incident angle. Further, as the incident angle increase the degree of the keystone distortion increase; compensation therefor is difficult and a stability problem occurs.

The present invention aims to overcome the above difficulties it is a primary object of the present invention to provide a television image projecting system in which a range within which the color balance is well maintained is broadened.

It is another object of the present invention to provide a television image projecting system in which the color balance is not disturbed even when the ambient temperature condition changes.

It is still another object of the present invention to provide a television image projecting system in which the projected television image include no unevenness in color.

It is further object of the present invention to provide a television image projecting system which can be constructed in a small size.

According to the present invention, a television image projecting system comprises a plurality of projecting systems for projecting selected colors, each including a phosphor target displaying a television image, an electron gun for directing an electron beam to the phosphor target and a lens system or spherical reflecting mirror optical system for projecting the television image on the phosphor target onto a screen, said plurality of projecting systems being sealed in a single cathode ray tube (hereinafter sometimes called a valve). The electron beams of the plurality of projecting systems are deflected by a single common deflector. When the spherical reflecting mirrors are used as the optical system for projecting the television images on the phosphor targets of the respective projecting systems, the spacing of the projecting systems is designed such that the reflecting mirrors of the adjacent projecting systems partially overlap each other and the overlapped portions are removed, or shield plates are provided at the boundary areas, whereby local change in the brightness of the projected image can be reduced and the spacing of the projecting systems can be effectively reduced. While the arrangement of the projecting systems may be of the delta type, an in-line arrangement allows the range within which proper color balance is assured to be broadened.

The above and other objects, features and advantages of the present invention will become more apparent from the following detailed description of the preferred embodiments of the invention when taken in conjunction with the accompanying drawings, in which.

Figure 1:
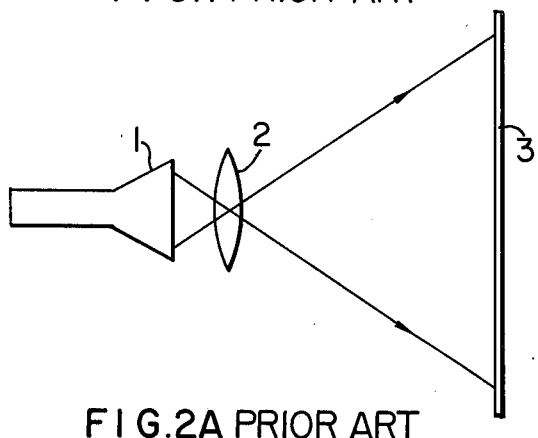
FIG. 1 is a front view of a prior art television image projecting system using a color CRT and a lens system.
Figure 2A:
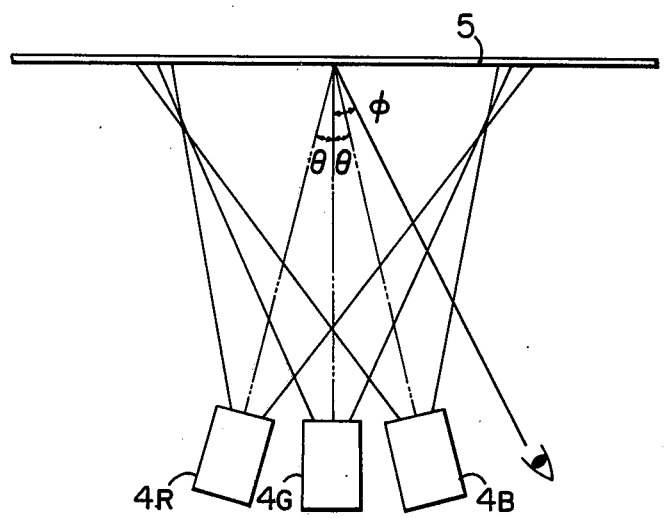
FIGS. 2A and 2B shows a prior art color television image projecting system using three red, green and blue projectors and the keystone distortion produced thereby.
Figure 2B:
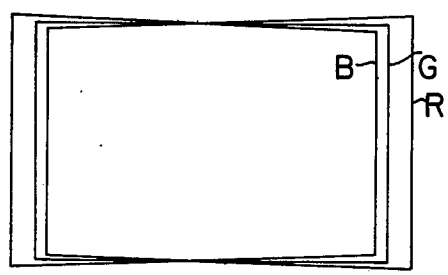
Figure 3:
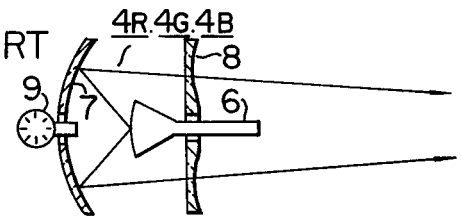
FIG. 3 is a partial sectional view illustrating the detail of the projector used in the projecting systems of FIGS. 2A and 2B.

Referring now to FIG. 1, a prior art projecting system is shown, which projects an image on a color CRT (cathode-ray tube) 1 onto a screen 3 by an optical system 2. FIGS. 2A, 2B and 3 show another prior art projecting system including three projectors. In the most commonly used projecting system of this type, the projectors 4R, 4G and 4B each comprises a monochromatic CRT 6, Schmidt optical system 7 and a correction lens 8. Because the heat dissipation on a phosphor screen of the CRT 6 is small, the CRT is usually air-cooled by a fan 9.

Figure 4A:
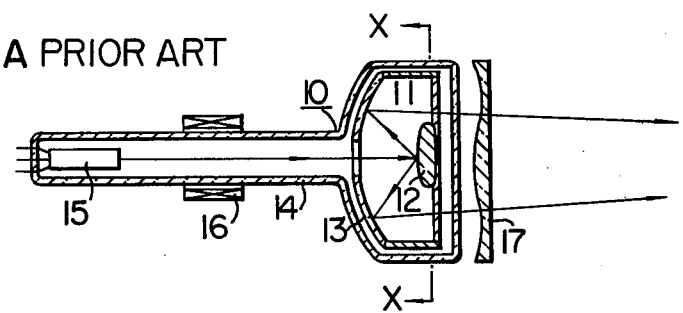
FIGS. 4A and 4B are longitudinal and cross sectional views, respectively, of another projector used in the projecting system of FIG. 2.
Figure 4B:
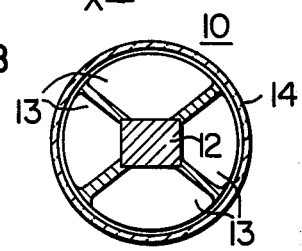
Figure 5:
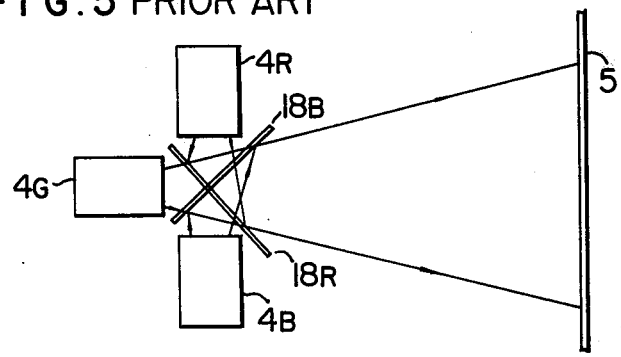
FIG. 5 is a front view of a prior art three-primary color projecting system which is different than the projecting system of FIG. 2.

On the other hand, a system using a CRT 10 of the structure shown in FIGS. 4A and 4B has been proposed. It comprises a phosphor screen 11 applied on a metal block 12, and a spherical reflecting mirror sealed in a valve 14. Since the heat dissipation of the phosphor screen 11 is remarkably improved the phosphor 11 can be driven to a maximum extent so that an image of high brightness can be projecting without requiring cooling. The CRT 10 further includes an electron gun 15, a deflector 16 and a correction lens 17. It is extremely effective to use this type of projecting CRT 10 in the projecting system of FIG. 2. The system using three-primary color projectors can be generally classified into two, one being the system shown in FIG. 2 in which three primary colors are projected from different positions and the other being a system as shown in FIG. 5 in which two dichroic mirrors 18R, 18B are used to project the images with their optical axes in alignment. In the system of FIG. 5 which uses the dichroic mirrors 18R and 18B, because of the halation of the mirrors 18R and 18B, the contrast of the projected image may be reduced or color shading may occur due to the difference in reflection index by the difference in incident angle, resulting in adverse affect on the image quality. Further the dichroic mirrors are expensive and have poor humidity resisting ability. For those reasons, the dichroic mirrors have not been commonly used and the system shown in FIG. 2 has been used in three-primary color projection.

In this case, however, there occurs a problem in that since the deflection coils of the respective projectors 4R, 4G and 4B are separate as described above, variations in the deflection constants due to a change in ambient temperature are not even so that color disturbance may occur because the amplitude linearities for red, green and blue change in a different manner.

In the projecting system as shown in FIG. 2 wherein a relatively high brightness is attained, let us consider a particular brightness obtainable. Since it is desirable to construct the system as small as possible, the phosphor screen size is preferably small, but because of the restriction due to the beam spot and the resolution power when the projected image is magnified, the phosphor size may be in the order of 3 inches. When a Schmidt optical system which shows a high utility rate is used as the optical system, the diameter of the spherical reflecting mirror should be at least twice as large as the phosphor screen size or in the order of 15 cm. Assuming that the projected image size is 50 inches for home entertainment use, the projection distance would be 1.5 – 2 meters considering the image size and the room size and assuming that the CRT's are used while the screens thereof are air-cooled, the total brightness for red, green and blue is expected to be 7000 ft-L. In this case, the brightness of the image projected on the screen can be determined from the following equation:

$$B_s = \eta_M \cdot \eta_L \cdot \frac{D^2}{4(M-1)^2 f^2} \cdot B_o$$

$$= \eta_M \cdot \eta_L \cdot \frac{D^2}{4 d^2} \cdot B_o$$

where $B_s$ is the brightness of the projected image on the projection screen, $B_o$ is the brightness on the CRT screen, $\eta_M$ is the reflection index of the mirror, $\eta_L$ is the transmission index of the correction plate, D is the diameter of the correction plate, M is the magnification factor, $f$ is the focal distance and $d$ is the projecting distance.

Assuming the $\eta_M = 80\%$, $\eta_L = 90\%$, D = 15 cm and placing those values in the above equation, $B_s \approx 7$ ft-L is derived.

The brightness of a commonly used direct viewing type CRT is about 200 ft-L at its highlight portion. Thus in order to make it possible for one to watch the projecting type color TV in a lighted room at the same brightness as the direct viewing type color TV, the screen should be highly directional and have a gain of about 20 – 30.

If the size of the spherical 5.0° mirror is about 15 cm and the projecting distance is selected to be 2 meters, and the red, green and blue are to be projected by separate projectors 4R, 4G and 4B as shown in FIG. 2, the angle $\theta$ as shown in FIG. 2, that is the angle between optical axes of the center projector 4G and the adjacent projectors 4R and 4B would be about 4.5° – 5.0° even if the projectors 4R, 4G and 4B are arranged very closely to each other. When the image is projected from the above different angles onto the screen 5 which is highly directional and has a gain of 20 – 30 as stated above, the principal axes of the red green and blue reflected lights do not align with each other so that the color balance changes as the viewer moves from position to position, which is an undesirable phenomenon for the color television image projecting system.

In order to more fully understand the relation between the incident angle and the directional property of the screen, a particular example will now be explained. Taking a commercially available aluminum foil screen as the screen 5, the horizontal scatter angle is about 20°, the vertical scatter angle is about 9° and the gain is about 15. When the projectors 4R, 4G and 4B are disposed in the arrangement shown in FIG. 2A and the images are projected onto the screen 5 (with the angle $\theta$ being 5°), the brightness ratios for red, green and blue, when one views the center of the screen 5 from a position at an angle $\phi$ with respect to the screen axis (which coincides with the optical axis of the green projector 4G), change significantly with the magnitude of $\phi$. The brightness ratios illustrated herein are taken for the red, green and blue phosphor screens which have been designed to be in white balance when the red : green : blue ratio are 15.6 : 100 : 12.3 on the screen axis. When different phosphors are used the brightnesses for the respective colors at $\phi = 0°$ will differ more or less although not substantially. Thus, when one views the screen 5 from a rightward position from the center of the screen 5, the entire image will be reddish. On the contrary, when one views from a leftward position, the image will be bluish. When the angle $\theta$ is 5° and the above aluminum foil screen is used as the screen 5 as in the above example, the area within which one can view the image without feeling substantial white balance disturbance will be in an area of $\phi = \pm 5°$ or so, which is a very restricted, narrow area.

Figure 6:
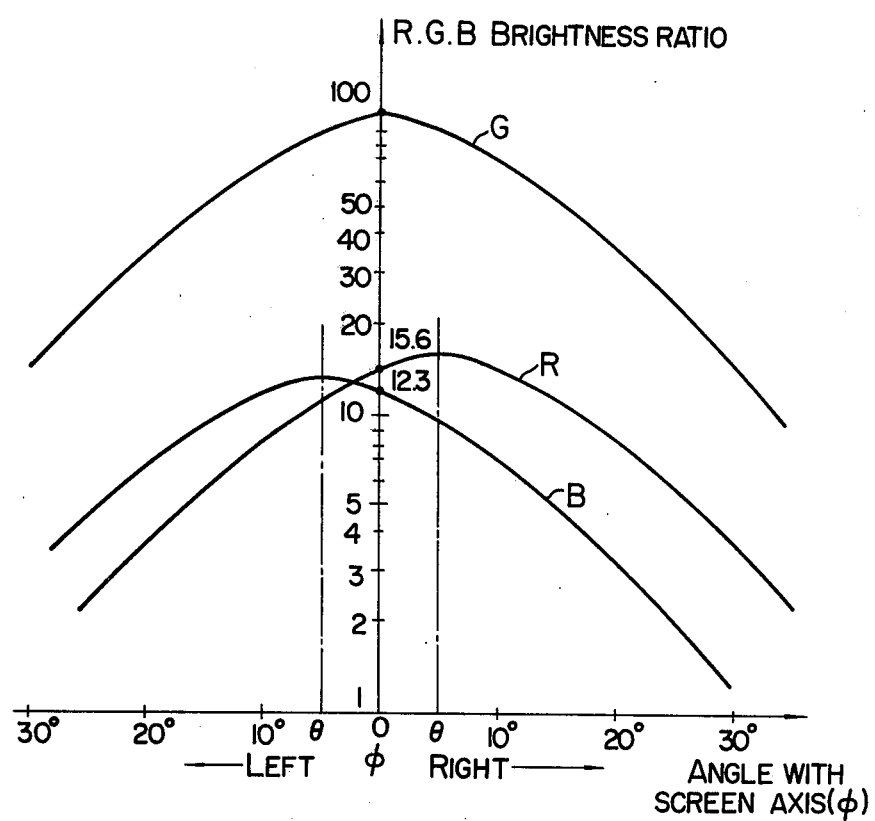
FIG. 6 is a characteristic diagram illustrating the relationship between the brightnesses of respective colors and viewing positions, in the television image projecting system.

In order to broaden the area within which one can view the image without feeling substantial white balance disturbance it is necessary to reduce the magnitude of the angle $\theta$ or select the screen 5 having a small directional property, as evident from FIG. 6. However, since the decrease in the directional property of the screen 5 will directly lead to the reduction in the screen gain, the brightness of the projected image will be undesirably reduced. Therefore the best way will be to reduce the angle $\theta$.

However, in the system illustrated in FIG. 2, it will be difficult from the standpoints of the brightness and resolution power to miniaturize the projectors 4R, 4G and 4B, and it will be disadvantageous to increase the projecting distance without changing the size of the projection screen 5 and the sizes of the projectors 4R, 4G and 4B because the light utilization rate is reduced.

As stated above, in the system which uses the projectors as shown in FIG. 2, it is very effective to use the construction shown in FIG. 4 as the projectors 4R, 4G and 4B. However, because the respective colors are projected by separate projecting CRT's, the color balance is unstable and the distance between respective projecting CRT's cannot be shortened beyond a minimum value. The system according to the present invention aims at overcoming the above inconvenience by accomodating all of the color generation sections in a single valve and effecting the deflection of electron beams by a single common deflector.

Figure 7A:
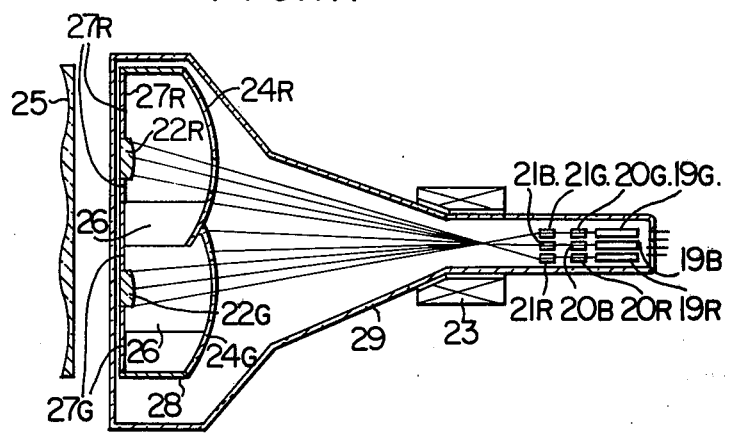
FIGS. 7A and 7B are longitudinal and cross sectional views, respectively, of a television image projecting system in accordance with one embodiment of the present invention.
Figure 7B:
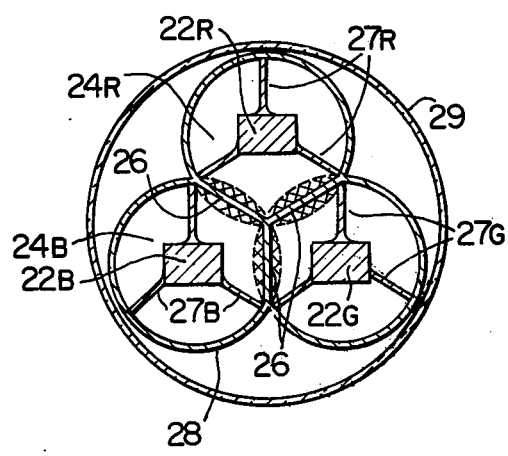

An embodiment of the present invention shown in FIG. 7 is first explained. Hereinafter, the letters R, G and B following the numerals designate those parts for red, green and blue. In FIG. 7, electron guns 19R, 19G and 19B are shown, which may be in parallel with a center axis of the CRT or may incline toward the targets. Magnet poles or electrodes 20R, 20G, 20B, 21R, 21G, and 21B serve to displace the rasters on the phosphor targets 22R, 22G and 22B to align three images on the projecting screen, and to correct keystone distortion caused by the beams which are directed onto the targets 22R, 22G and 22B at an angle and the keystone distortion caused during projection. A common deflector 23 deflects beams of different colors, and spherical reflecting mirrors 24R, 24G and 24B of projecting Schmidt optical systems for respective colors are provided behind the phosphor targets 22R, 22G and 22B of the respective colors. A Schmidt correction lens 25, a shield plate 26 for preventing light from the targets 22R, 22G and 22B from entering other spherical mirrors 24R, 24G and 24B, arms 27R, 27G and 27B for supporting the targets, and an outer tube 28 for positioning and fixing the targets 22R, 22G and 22B to align with the spherical reflecting mirrors, 24R, 24G and 24B, are also provided. In this manner, the electron gun 19R, the magnet poles or electrodes 20R, 21R, the phosphor target 22R and the reflecting mirror 24R constitute a red projecting system, the electron gun 19G, the magnet poles or electrodes 20G, 21G, the phosphor target 22G and the reflecting mirror 24G constitute a green projecting system, and the electron gun 19B, the magnet poles or electrodes 20B, 21B, the phosphor target 22B and the reflecting mirror 24B constitute a blue projecting system, and those systems are arranged such that the television images projected from those systems are superimposed on the screen. In the case illustrated, the spacings between the projecting systems are selected to be narrow so that the reflecting mirrors 24R, 24G and 24B of the adjacent projecting systems partially overlap each other, and the overlapped portions of the reflecting mirrors 24R, 24G and 24B (shown by cross hatchings in the drawing) are removed at the overlapped ends and the shield plates 26 are provided at the boundaries.

As seen from the drawing, since all of the three projecting systems are sealed in one valve 29 and the beams are deflected by one common deflector 23, the variation of the constants of the deflection coil due to changes in conditions such as temperature change is equal for the three primary colors, i.e., red, green and blue. Therefore the stability of the color disturbance is far superior to the system shown in FIG. 4 where threee monochromatic projecting tubes are used. Thus, the advantage of high stability in color disturbance in the color CRT direct viewing type projection as shown in FIG. 1 can be combined with the advantage of high brightness and high resolution power in the three-primary color projection shown in FIG. 2 so that a very effective system is provided.

While the optical axes of the optical systems for the respective colors are shown to be in parallel in the system of FIG. 7, it should be understood that the optical axes of the respective optical systems may be inclined toward the center of the screen.

The valve 29 need not be circular as shown in FIG. 7 but may be triangular which is more similar to the contour formed when the three spherical reflecting mirrors 24R, 24G and 24B are coupled together.

Further, while the three optical systems are delta-arranged in FIG. 7, they may be in-line arranged either horizontally or vertically to obtain the same effect.

In the present system, as seen from the drawing, the spacings between the three projecting systems are selected to be as small as possible so that the projecting systems are disposed in close relation to cause the spherical reflecting mirror 24R, 24G and 24B of the respective colors to partially overlap each other, and the overlapped portions are removed to attain the illustrated arrangement. Within the extent of the illustrated removal of the reflecting mirrors 24R, 24G, and 24B, the local change in the brightness of the projected image caused thereby is small so that the spacings between the respective projectors can be effectively shortened and a uniform color balance over a wide service area attained even when a highly directional screen is used.

Figure 8A:
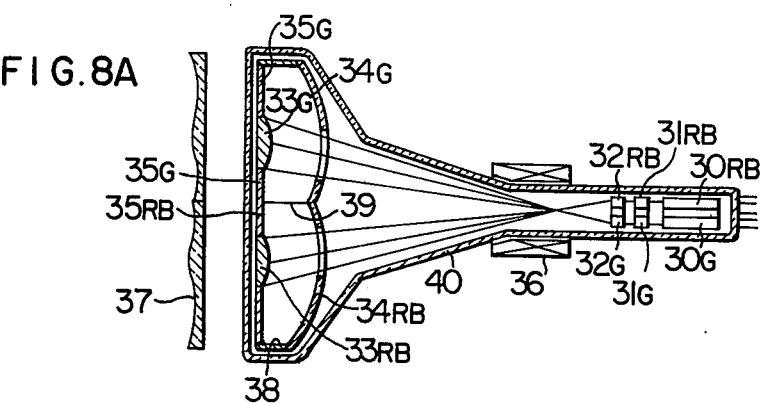
FIGS. 8A and 8B are longitudinal and cross sectional views, respectively, of a television image projecting system in accordance with another embodiment of the present invention.
Figure 8B:
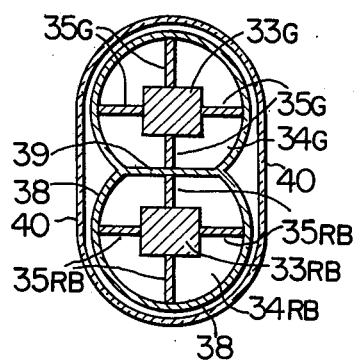

FIG. 8 shows a projecting system in accordance with another embodiment of the present invention.

The quality of the projected image by the three-primary color synthesis is largely influenced by the green which presents the highest viewing sensitivity. Thus, so long as the focusing for the green image is proper one does not feel that the focusing is out of order even if the focusing for red and blue images is somewhat improper. Therefore, when the green primary color image is projected by a monochromatic projecting system consisting of a green electron gun 30G, correction electrodes 31G, 32G, the phosphor target 33G, a spherical reflecting mirror 34G and a target support arm 35G and the red and blue images are projected by a dichromatic projecting system (having red-blue color switching section to enable the projection of both colors) which inherently has a low resolution power, the resolution power of the entire image will not change substantially. The dichromatic projecting system comprises a red-blue electron gun 30RB, correction electrodes 31RB, 32RB, a phosphor target 33RB, a spherical reflecting mirror 34RB, and a target support arm 35RB. A common deflector 36, a Schmidt correction lens 37, an outer supporting tube 38, a shield plate 39 and a valve 40 are included in the system. In this manner, the color image projection is effected by two projection channels as shown in FIG. 8. In this case, however, when a color switching structure such as a shadow mask or aperture grill which is commonly used in the direct viewing type color CRT is used, it will prevent the light emitted from the face of the target 33RB from passing toward the reflecting mirror 34RB. Therefore, it cannot be used here. Thus, another structure in which one electron beam switches color and yet the light emitted from the face of the phosphor target 33RB is not prevented from passing toward the reflecting mirror 34RB, such as that which uses a principle similar to that of a beam indexing tube, is used. The images from the two projecting channels are superimposed on the screen to produce a color image. In this manner, the color stability in the superposition is improved and the service area can be broadened even when a highly directional screen is used, as in the previous embodiment.

The present projecting system is very effective not only for color image projection but also for a two-primary color display device where the image is projected onto a highly directional screen. Furthermore, it will be effective to construct a projection valve including four projecting systems for red, blue, green and white, each comprising an electron gun, target and a reflecting mirror.

Figure 9A:
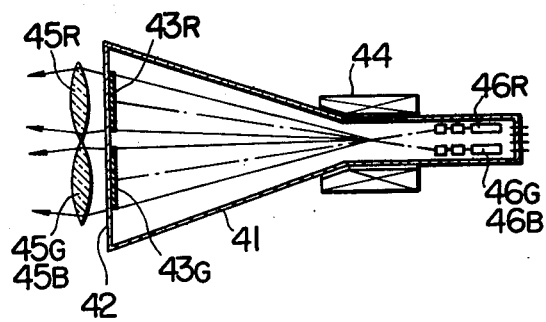
FIGS. 9A and 9B are longitudinal and cross sectional views, respectively, of a television image projecting system in accordance with still another embodiment of the present invention.
Figure 9B:
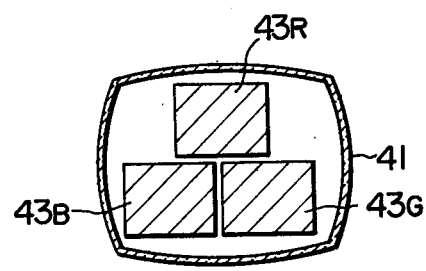

Alternatively, the construction shown in FIG. 9 may be employed in the projecting system. In this instance, a front glass 42 of a valve 41 is discretely coated by phosphors 43R, 43G and 43B for emitting three primary colors, i.e., red, green and blue, and a raster is scanned on the respective phosphors 43R, 43G and 43B by a common deflector 44, and the resultant image is projected through lens systems 45R, 45G and 45B for the respective colors. With the above arrangement a similar effect may be attained. Again, in this case, the arrangement of coating of the phosphors 43R, 43G and 43B and the arrangement of the electron guns 46R, 46G and 46B may be an in-line arrangement rather than a delta arrangement.

As described above, the present television image projecting system is characterized in that a plurality of phosphor targets each emitting different color from each other and a plurality of electron guns for directing electron beams to the phosphor targets are sealed in one valve, and that the electron beams from the plurality of electron guns are deflected simultaneously by the common deflector to display independent television images on the plurality of phosphor targets, and that these television images are projected. Thus, the influence by the change in characteristic of the deflector is equally imparted to the plurality of electron beams so that the changes in the respective television images occur in the same manner, and hence color disturbance of the projected television images can be prevented.

Furthermore, since the projecting systems are closely spaced such that the edges of the spherical reflecting mirrors of the projecting systems partially overlap each other and then the overlapped portions are removed, the projection may be carried out to assure the image of high color balance over a wide range.

Figure 10A:
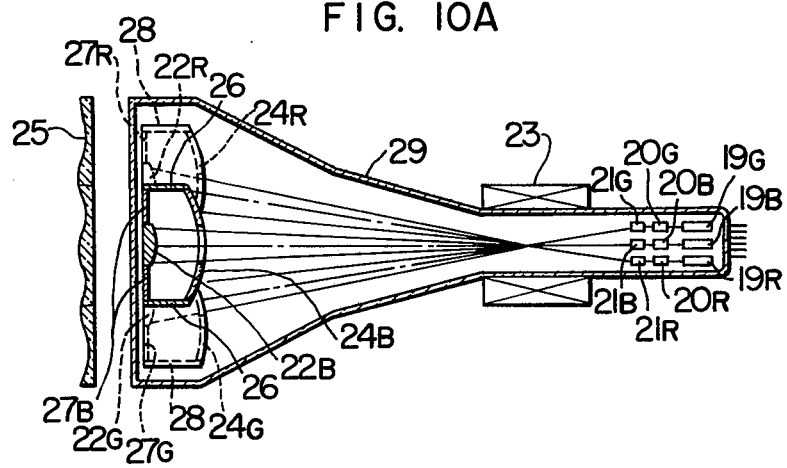
FIGS. 10A and 10B are longitudinal and cross sectional views, respectively, of a television image projecting system in accordance with a further embodiment of the present invention.
Figure 10B:
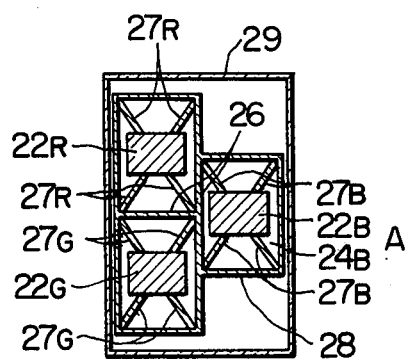
Figure 11A:
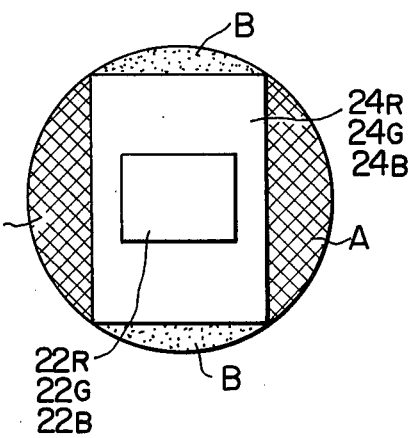
FIGS. 11A and 11B illustrate the removal of the overlapped portions of the spherical reflecting mirrors.
Figure 11B:
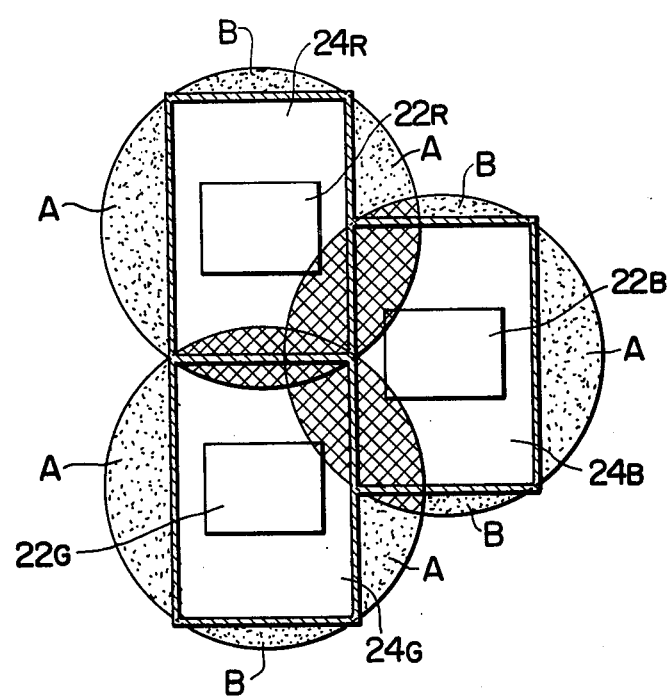

FIGS. 10 and 11 show an embodiment of an optimum removal of the spherical reflecting mirrors. In the embodiment shown in FIG. 10, the portions A of the spherical reflecting mirrors 24R, 24G and 24B which face the shorter sides of the phosphor targets 22R, 22G and 22B are largely removed while portions B which face the longer sides are removed only over a small area so that a generally rectangular shape, as viewed from the front, is defined. The spherical reflecting mirrors 24R, 24G and 24B of adjacent projecting systems are placed side by side with the removed edges being boundaries therebetween and the shield plates 26 are provided at the boundaries. Alternatively, the portions B of the spherical reflecting mirrors 24R, 24G and 24B which face the longer sides of the targets 22R, 22G and 22B need not be removed.

Figure 12:
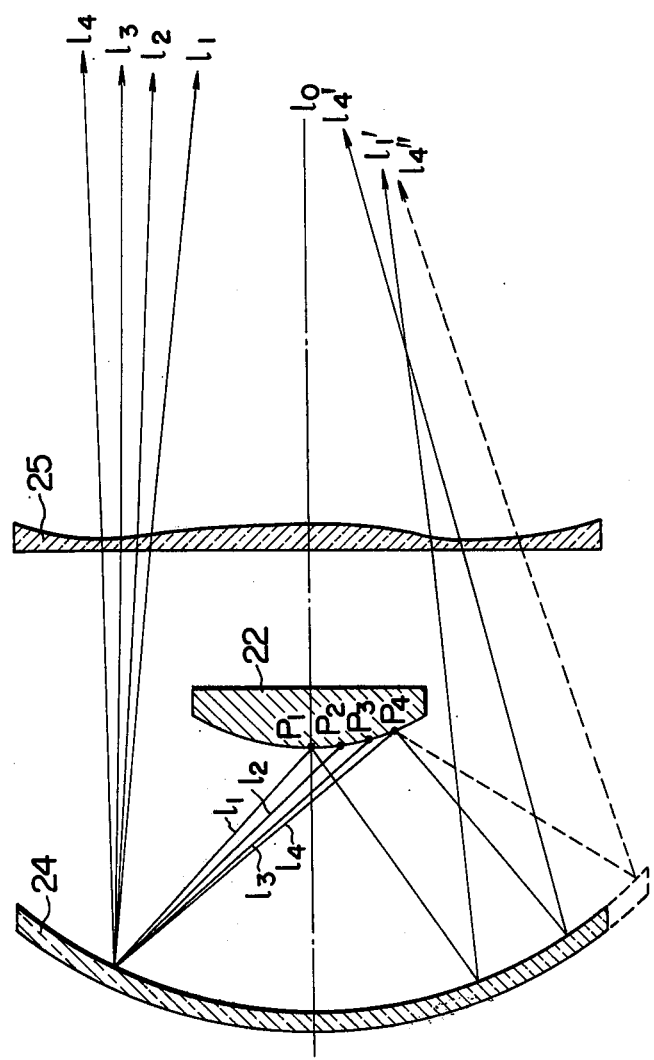
FIG. 12 illustrates the paths of rays reflected by the spherical reflecting mirrors.
Figure 13:
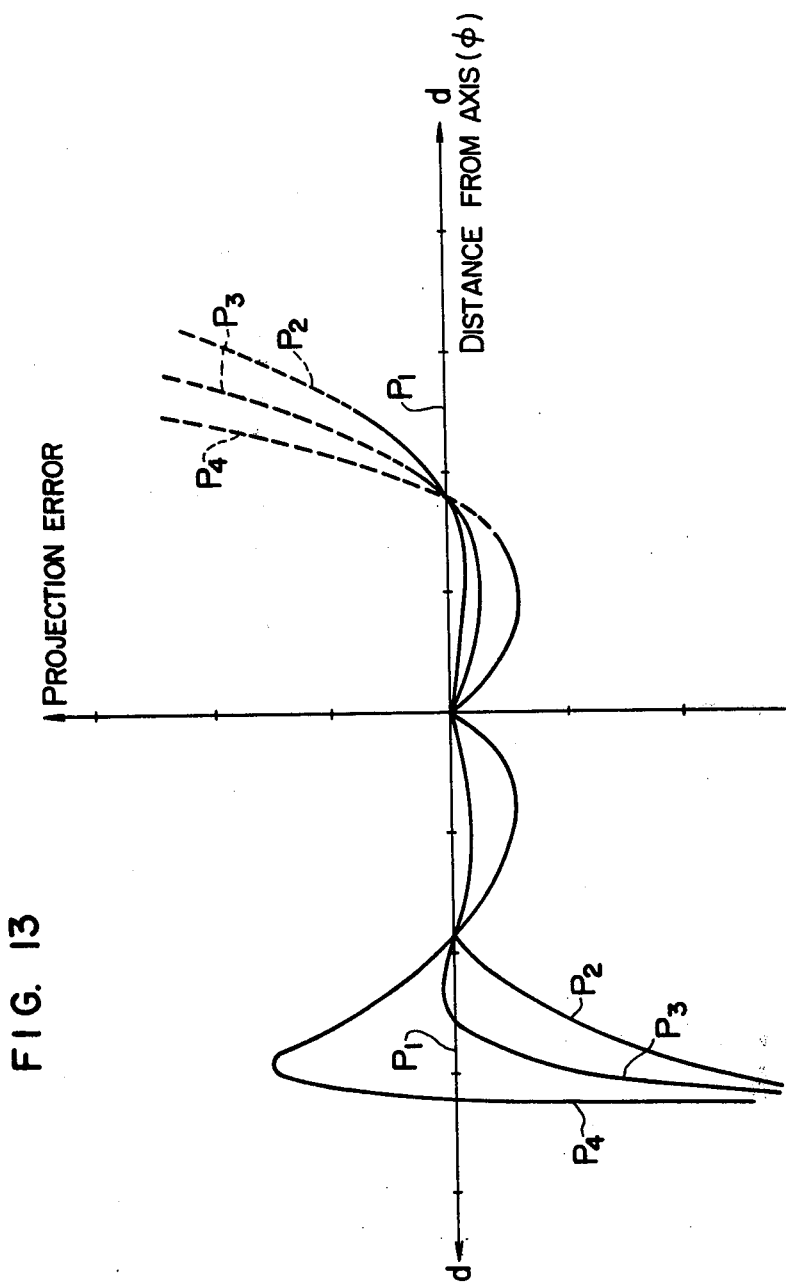
FIG. 13 is a graph showing projection errors of the rays shown in FIG. 12.
Figure 14A:
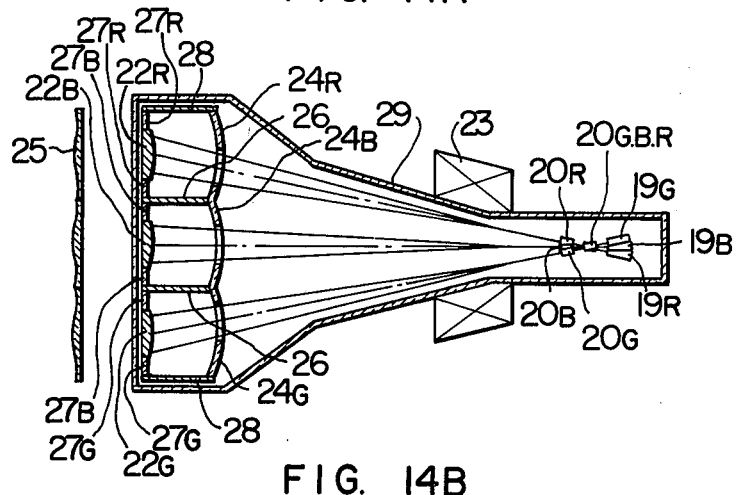
FIGS. 14A, 14B, 14C and 14D are longitudinal and cross sectional views of a projecting system in accordance with another embodiment of the present invention.
Figure 14B:
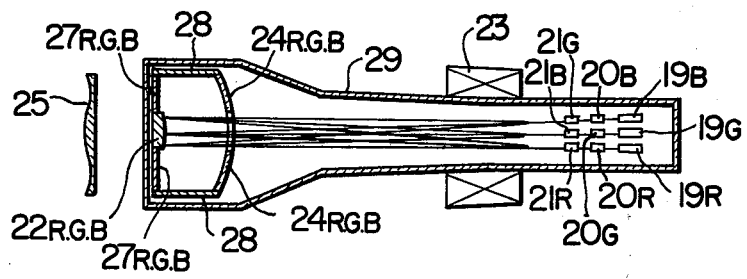
Figure 14C:
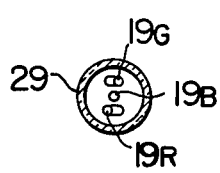
Figure 14D:
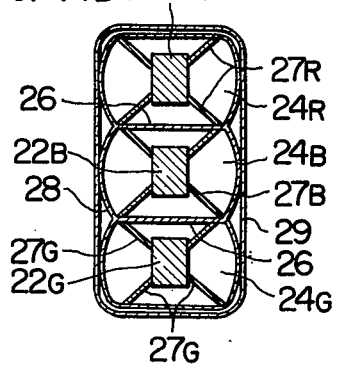
Figure 15A:
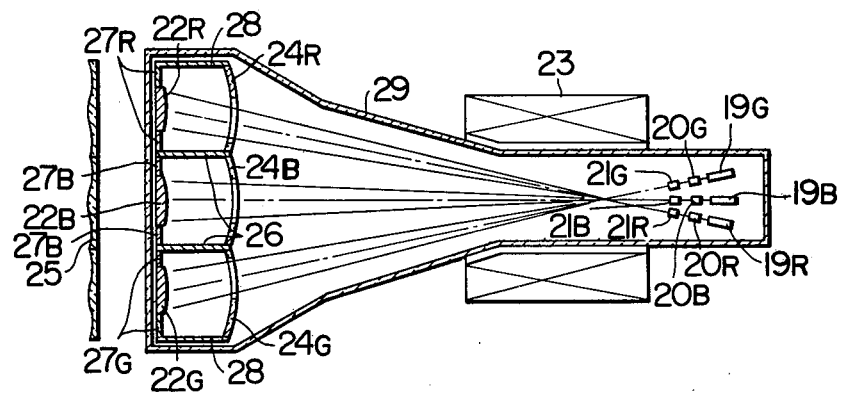
FIGS. 15A, 15B, 15C and 15D are longitudinal and cross sectional views of a projecting system in accordance with another embodiment of the present invention.
Figure 15B:
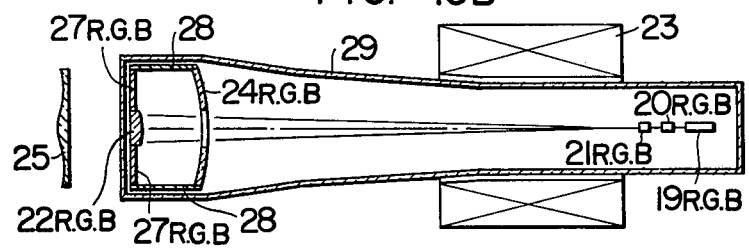
Figure 15C:
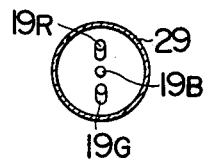
Figure 15D:
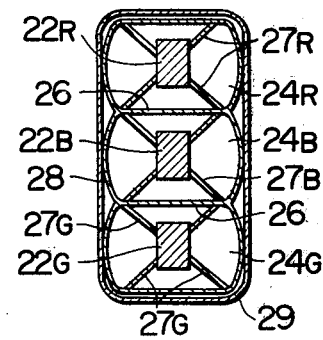

The removal of the portions A of the spherical reflecting mirrors 24R, 24G and 24B which face the shorter sides of the targets 22R, 22G and 22B is very advantageous in improving the quality of the projected image. This will now be explained with reference to FIGS. 12 and 13. FIG. 12 shows the light paths for a light ray $l_1$ emitted from a point $P_1$ on a projection axis $l_0$ on the face of the target 22 and light rays $l_2 - l_4$ emitted from points $P_2 - P_4$ displaced from the projection axis after they have been reflected at one and the same point on the spherical reflecting mirror 24. As seen from the drawing, the further the emitting point is displaced from the projection axis $l_0$, the further displaced is the position on the correcting lens the light ray pass through. FIG. 13 shows a graph in which the oridinate represents the displacement of the light rays emitted from the points $P_1 - P_4$ from an ideal focal point on the projecting screen and the abscissa represents the distance d from the axis $l_0$ when the light rays pass through the correction lens 25. The right section of FIG. 13 shows the light rays reflected by a lower half of the spherical reflecting mirror 24 in FIG. 12 and the left section shows the light rays reflected by an upper half. The dashed area in the right section shows an area where reflected light does not exist in a conventional Schmidt optical system because of the limitation in sixe of the spherical reflecting mirror 24. It is thus seen that the light rays emitted from the points other than the center of the target 22 accompany the areas in which projection errors occur, and those projection errors increase as the light emitting point is further displaced from the point $P_1$ (center point) on the face of the target 22, and the reflection point on the spherical reflecting mirror 24 moves toward the periphery thereof. The greater the projection error the more the focusing of the projected image becomes out of order and the lower the resolution power becomes. As seen from FIGS. 12 and 13, in a conventional Schmidt optical system, the resolution power in a peripheral area is lower than that in a center area, and the adverse affect thereby will remarkably appear when a light ray emitted near the shorter side at a point distant from the point $P_1$ on the face of the rectangular target 22 is reflected by the portion of the spherical reflecting mirror 24 which faces the opposite shorter side. When the spherical reflecting mirror 24 is partially removed at its edge facing the shorter side of the target 22 as shown in FIG. 10, the light ray which is emitted at a distant point from the projection axis parallel to the longer side of the target 22 and reflected by the spherical reflecting mirror 24 at the outermost portion thereof and hence would have a large projection error, is eliminated so that the disorder of the focusing at the peripheral portion of the projected image can be resolved.

Further, in the system shown in FIG. 10, those portions of the spherical reflecting mirrors 24R, 24G and 24B which overlap each other when the three projecting systems are disposed closely to each other, are removed, so that the projecting systems are assembled to have analogous arrangements of the phosphor targets 22R, 22G and 22B and the spherical reflecting mirrors 24R, 24G and 24B.

By the above analogous removal of the portions of the spherical reflecting mirrors 24R, 24G and 24B and the arrangement of the targets 22R, 22G and 22B to assure the analogous contour of the projecting face, the decreases in local brightnesses of the projected images for three primary colors, i.e., red, green and blue are equal so that the phenomenon of causing local color disturbance in the projected image, that is, color shading, can be eliminated. Further, since the three reflecting mirrors 24R, 24G ad 24B can be partially removed, the optical axes of the three projecting systems can be far more closely disposed compared with the system shown in FIG. 2.

Figure 16A:
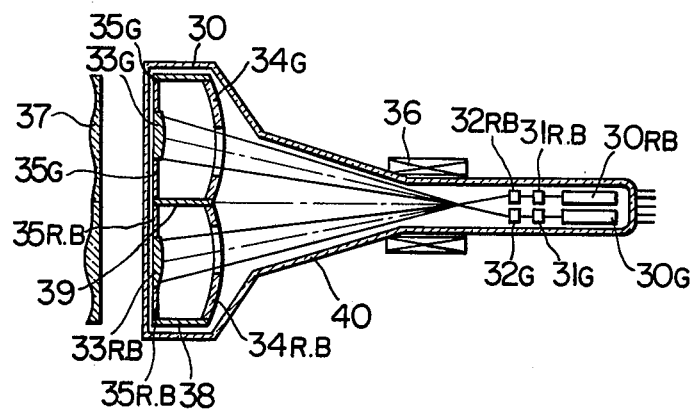
FIGS. 16A and 16B are longitudinal and cross sectional views of a projecting system in accordance with still another embodiment of the present invention, in which two projector systems are used.
Figure 16B:
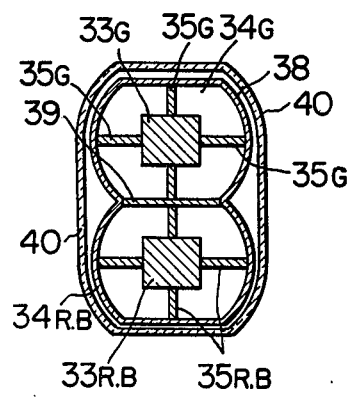

While the three projecting systems are delta arranged in the above embodiments, the same effect can be obtained when they are in-line arranged, either horizontally or vertically. Such embodiments are shown in FIGS. 14, 15 and 16, where the parts corresponding to those in FIGS. 7 and 8 are represented by the same reference numbers and are not explained here.

In the in-line arrangement shown in FIGS. 14 and 15, if the three spherical reflecting mirrors 24R, 24G and 24B are partially removed to present the same contour, the decreases in local brightnesses of the projected images for the three principal colors, i.e., red, green and blue, are equal and hence the three reflecting mirrors 24R, 24G ad 24B can be partially removed to a large extent without considering the occurence of color shading, and the optical axes of the three projecting systems can be far more closely disposed to compare with the system shown in FIG. 2.

Figure 17:
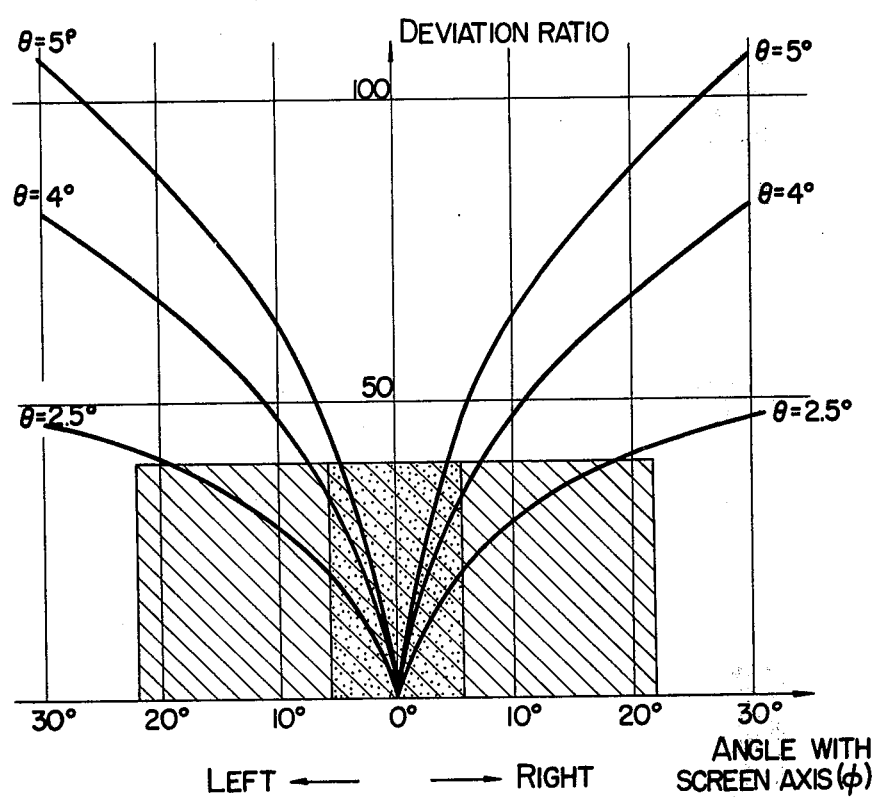
FIG. 17 is a graph showing the disturbance in white balance when the projecting systems of FIGS. 14 and 15 are used.

To compare the projection angles for the system shown in FIG. 2 and the systems of FIGS. 14 and 15, the angle θ can be reduced to as small as 4.5° – 5° in the system of FIG. 2 while it can be reduced down to 2° – 3° in the system of FIGS. 14 and 15. As to a service area, when the screen having the same characteristic as described above and a gain of about 15 is used, one feels the disturbance of color balance when the angle $\phi$ with respect to the screen axis exceeds ± 5° in the system of FIG. 2 while the angle $\phi$ within which one does not feel the disturbance of the color balance can be widened to ± 20° or more in the embodiment of FIGS. 14 and 15 with a screen of the same characteristic and the same projection distance. This is apparent from FIG. 17 in which the abscissa represents the angle $\phi$ with respect to the screen axis and the ordinate represents the brightness ratio for the three primary colors, i.e., red, green and blue required to produce white. The dotted area in the drawing shows an area in which the color balance is not so disturbed that one feels uncomfortable when three projectors as shown in FIG. 2 are used, and the hatched area shows an area in which the color balance is not so disturbed that one feels uncomfortable when the projecting systems shown in FIGS. 14 and 15 are used.

Figure 18:
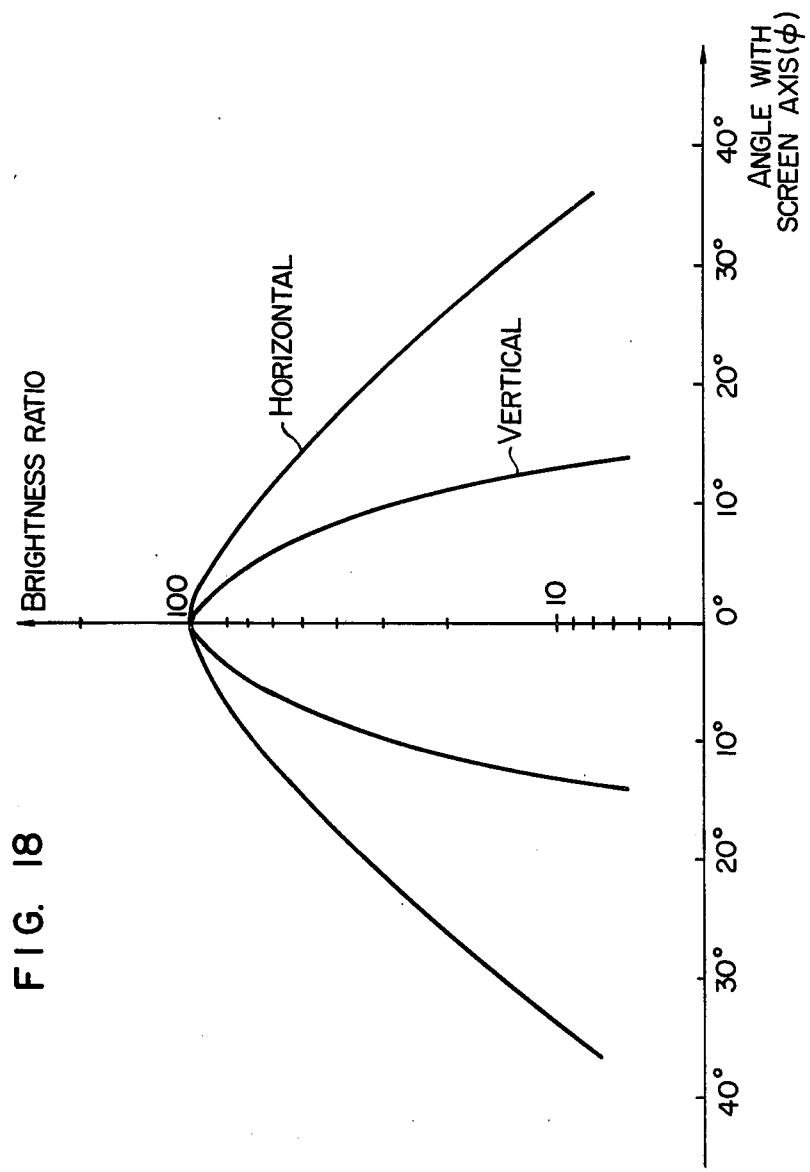
FIG. 18 is a graph showing a reflection characteristic of a screen.

In the present projecting system, when all of the projector systems are in-line arranged along the direction of the targets 22R, 22G and 22B as shown in FIGS. 14 and 15, and the spherical reflecting mirrors 24R, 24G and 24B having their edges facing the shorter sides of the targets 22R, 22G and 22B removed are disposed side by side so that their removed edges contact each other, the projection angle in the vertical direction can be reduced to zero and hence the television image which assures that a viewer may feel the same color balance at whatever position along the vertical direction he may view the image, is produced. This is particularly effective when the screen has a vertically directed reflection characteristic as shown in FIG. 18 and also shows a sharp directional property. With the above arrangement, a highly directional screen or a high gain screen may be used and hence the image brightness can be enhanced. Further, by sharpening the vertical directional property of the screen, the effect of the light impinging onto the screen from a ceiling or the like can be eliminated resulting in improved contrast of the image and an improved image quality. The vertical directional property of the screen is designed to be sharper than the horizontal directional property because the viewers usually occupy a broader area in the lateral direction in front of the screen than in the longitudinal direction. Moreover, in general, the viewers may swing their heads horizontally but rarely swing vertically and hence they are very insensitive to the change in brightness by movement of the vertical viewing position. Therefore, it is a very efficient way to obtain a high gain screen by rendering the horizontal directional property relatively gentle and the vertical directional property very sharp.

In the system shown in FIG. 14, the arrangement of the electron guns is also considered, that is, the electron guns 19R, 19G and 19B are in-line arranged orthogonally to the in-line arrangement of the targets 22R, 22G and 22B and the spherical reflecting mirrors 24R, 24G and 24B. This arrangement is used to allow the use of a small size of valve 29 to provide a small size system. That is, with the above orthogonal in-line arrangement, the length of the neck of the valve 29 can be shortened and the diameter thereof reduced to compare with the arrangement of FIG. 15 where the electron guns are in-line arranged in the same direction as the in-line arrangement of the targets 22R, 22G and 22B and the sperical reflecting mirrors 24R, 24G and 24B. In the systems of FIGS. 14 and 15, the spacings of the electron guns and the spacings between the electron guns and the valve 29 are shown to be the same.

While a particular contour of the spherical reflecting mirrors 24R, 24G and 24B has been shown in the above embodiments, the contour thereof should not be limited to the above particular example and it may be circular in certain instances.

Figure 19A:
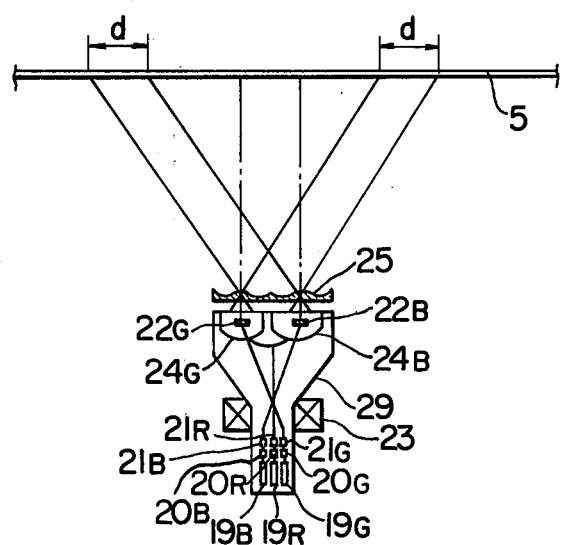
FIGS. 19A and 19B are a front view of a projecting system in accordance with another embodiment of the present invention in which a plurality of projector systems are arranged in parallel with an optical axis, and a view illustrating television images produced therein.

FIG. 19 shows an embodiment in which all of the optical axes of the plurality of projecting systems are parallel. While FIG. 19 is schematically shown, the detailed structure thereof is similar to the above embodiments, and it is characterized in that the phosphor targets 22R, 22G and 22B and the spherical reflecting mirrors 24R, 24G and 24B are arranged such that the projecting axes for the red, green and blue projecting systems are disposed in parallel.

Figure 19B:
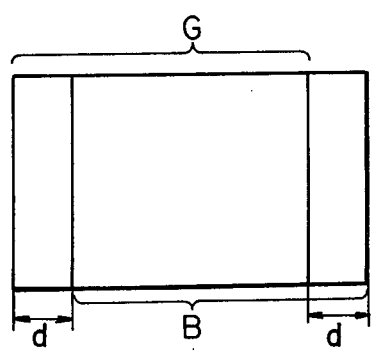
Figure 20A:
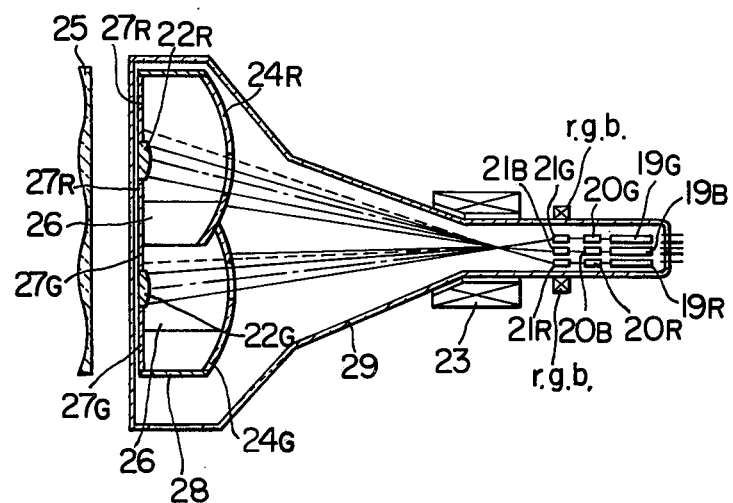
FIGS. 20A and 20B are longitudinal and cross sectional views of a projecting system in accordance with a further embodiment of the present invention.
Figure 20B:
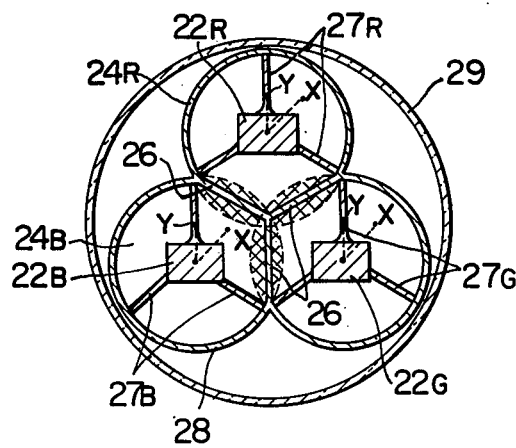
Figure 21A:
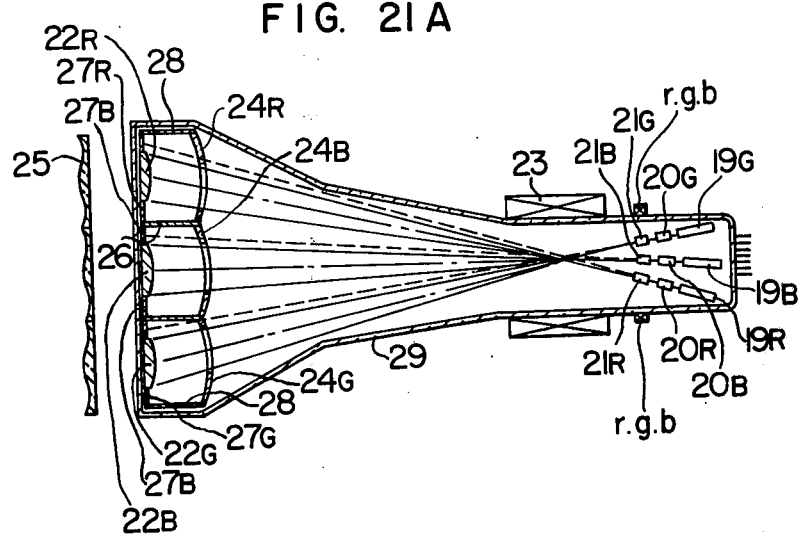
FIGS. 21A and 21B are longitudinal and cross sectional view of a projecting system in which a plurality of projectors are in-line arranged in the system of FIG. 20.
Figure 21B:
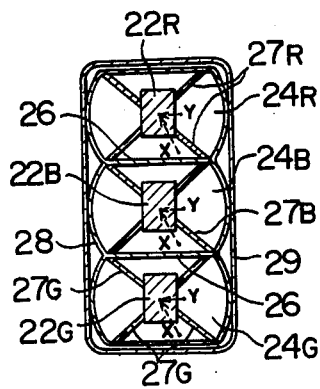
Figure 22A:
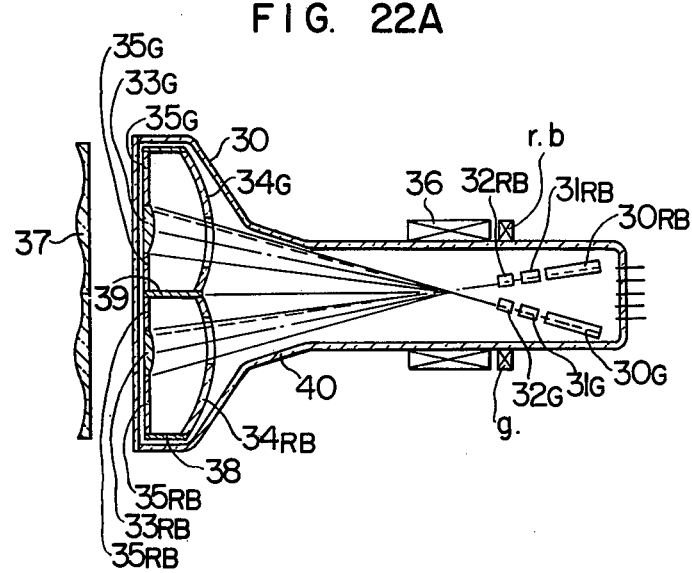
FIGS. 22A and 22B are longitudinal and cross sectional views in which two projectors are used in the system of FIG. 21.
Figure 22B:
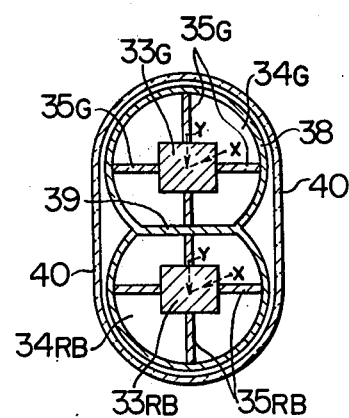

Since all of the projecting axes from the three projecting systems to the screen 5 are disposed in parallel, when the positions of the television images on the respective phosphor targets 22R, 22G and 22B are aligned, the television images on the screen 5 are free from keystone distortion due to the projection, as seen from a principle chart shown in FIG. 19B, but displaced in parallel with each other, although color disturbance exists because of the positional displacement. In this case, it is assumed that the television images on the phosphor targets 22R, 22G and 22B have been corrected to have completely identical patterns to each other.

Under this condition, by D.C. shifting, in parallel, the positions of the television images on the phosphor targets 22R, 22G and 22B, the television images on the screen 5 can be readily and precisely superimposed. Further, since the projection axes are perpendicular to the face of the screen 5, the disorder of the focusing due to the difference in the projection distance between the righthand and the lefthand of the image, does not occur and the plurality of images can be completely superimposed. Moreover, with the present arrangement, the correction lenses 25 can be disposed on one place and can be integrally molded on one place so that the manufacturing cost of the correction lenses can be substantially reduced.

The distance of the parallel shift of the positions of the television images is $d$ on the face of the projecting screen 5, as shown in FIG. 19B, which distance $d$ is equal to the distance between the projecting optical systems, as in apparent from the drawing. The distance of shift required on the phosphor target 22R, 22G and 22B to shift the image by $d$ on the projecting screen 5 is D/M, where M is a magnification factor. As a specific example, when the distance between the optical systems is 20 cm and the magnification factor is 30, then $D/M = 0.7$ cm, and the distance of shift required on the targets 22R, 22G and 22B may be one half of the above distance or 3.5 mm. Thus, by designing the phosphor targets 22R, 22G and 22B slightly larger, it is possible to shift only by use of a D.C. electric field or D.C. magnetic field by correction means such as correcting magnet poles or electrodes 20R, 20G, 20B, 21R, 21G and 21B. In this instance, the arrangement of the phosphor targets and the spherical reflecting mirrors may be either delta type as described above or in-line type.

In the above embodiments, as seen from the drawings, since all of the three projecting systems are sealed in one valve 29 and the electron beans of the plurality of projecting systems for the respective colors are deflected by the common deflector, the variation in the constants of the deflection coil or the like due to temperature change or the like equally affects the red, green and blue projecting systems simultaneously so that the stability of color disturbance is far superior to the system of FIG. 4 where three monochromatic projecting tubes are separately used, and the stability of the color disturbance can approach that of the color CRT direct viewing type projection as shown in FIG. 1.

A modification which enables further reduction of color disturbance in the above television image projecting system is now explained. In the construction as shown in the embodiments illustrated above, the electron guns 19R, 19G and 19B are arranged such that when the electromagnetic deflection caused by external current such as the electromagnetic deflection caused by externally supplying a deflection current to the deflector 23 or the deflection means comprising the magnet poles or electrodes 20R, 20G, 20B, 21R, 21G and 21B (for example, a deflection similar to a convergence correction) is ceased, all of the electron beams impinge on the targets 22R, 22G and 22B of the respective projecting systems. In this case the electron beams advantageously impinge at the same positions, the centers for example, of the targets 22R, 22G and 22B. With the present arrangement, the amount of the static electromagnetic deflection which must be applied to the electron beams may be very small and hence the degree of the color distortion by the change in the deflection characteristic due to variation in deflection current or the like can be further reduced. Further, even when the magnitude of the electron beam accelerating high voltage changes, the radiation axes of the electron beams do not change and hence the color disturbance does not occur although the size of the television image on the screen may change.

Alternatively, as shown in FIGS. 20 – 23, the electron guns 19R, 19G, 19B, 30RB, 30G of the projector system may be arranged and oriented such that when the electromagnetic deflection by external current such as the electromagnetic deflection caused by supplying external deflector current to the deflection 23 and by the deflection means of the magnet poles or electrodes 20R, 20G, 20B, 21R, 21G and 21B (for example, a deflection similar to convergence correction) is ceased, all of the electron beams impinge on positions displaced by the same distance from the targets 22R, 22G and 22B of the projecting system, e.g., the positions X or Y indicated in the drawing. With this arrangement, since the electromagnetic deflection simultaneously carries out the ion trapping, the ion burning of the targets 22R, 22G and 22B can be prevented without requiring special ion trapping means. The magnetic field or electric field generated by an external current is applied to one or both of the electrodes or magnet poles 20R, 20G, 20B, 21R, 21G and 21B to correct the orientations of the electron beams so that they impinge onto the targets 22R, 22G and 22B. As means for carrying this out, when 20R, 20G, 20B, 21R, 21G and 21B are magnet poles, for example, exciting coils $r$, $g$, $b$ are provided around the magnet poles and D.C. currents are supplied thereto to effect correction by electromagnetic deflection. Alternatively, when they are electrodes, D.C. electric fields may be applied for correction.

With the above arrangement, the senses and the magnitudes of the correction amounts can be substantially identical for the respective projecting systems, and in certain cases it is possible to simultaneously correct the three projecting systems by a common correction means. When the respective projecting systems are separately corrected, since the senses and the magnitudes of the correction amounts are same, the respective projecting systems are equally affected by the change in ambient condition such as temperature and the change in power supply voltage. Thus, even if the sense and/or the magnitudes of the correction magnitude vary, the three projecting systems are equally affected and the superposition of the television images does not change although the images may move. Therefore, the color disturbance will not occur. In this manner, very high color stability is assured.

Figure 23:
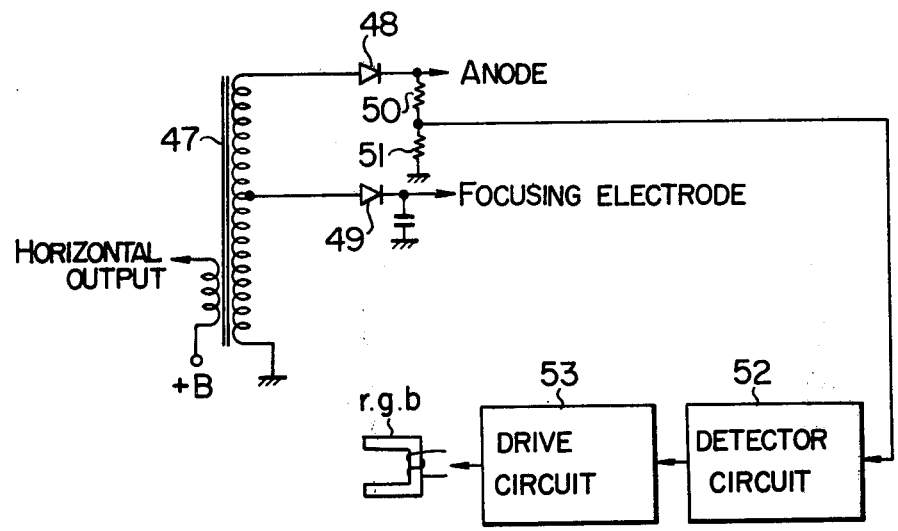
FIG. 23 shows a circuit diagram for preventing the movement of the television image due to variation in the accelerating high voltage.

Since the above shift of the television images is mainly caused by the change in the electron beam accelerating high voltage, the above shift may be prevented by controlling the correction means in response to the change in the accelerating high voltage to cancel the shift due to the change of the accelerating high voltage. One embodiment therefor is shown in FIG. 23 wherein, in a high voltage generating circuit having a secondary winding of a flyback transformer 47 for generating accelerating high voltage connected to diodes 48 and 49 for rectifying the focusing voltage, the output of the accelerating high voltage is divided by resistors 50 and 51 and the variation thereof is detected by a detector circuit 52. The output of detector circuit 52 controls a drive circuit 53 to control the magnitude of a correcting current to be supplied to correcting coils $r$, $g$ and $b$ for suppressing the shift of the television images due to the change in high voltage. For example, when the accelerating high voltage rises, the correcting current may be increased to increase the correction amount and when the accelerating high voltage falls, the correcting current may be decreased to reduce the correction amount. More particularly, the correction amount $l$ can be given by the following relation:

$$\left. \begin{array}{l} I \alpha \dfrac{1}{\sqrt{E_h}} \\ I \alpha H \end{array} \right\} \text{ Hence, } I \alpha \dfrac{H}{\sqrt{E_h}}$$

$H \alpha I$ where H represents the correcting magnetic field, $E_h$ represents the accelerating high voltage and I represents a current flowing through electromagnet coils $r$, $b$, $g$ which are used to generate the magnetic field H. Thus, if the requirement of $H \alpha \sqrt{E_h}$ or $I \alpha \sqrt{E_h}$ is met, $I$ may be maintained to a fixed value irrespective of the change in the high voltage. Thus, when the electromagnetic field H is generated by a current whose magnitude is proportional to square root of the magnitude of the high voltage by a circuit shown in FIG. 23 and the electron beams are shifted by such electromagnetic field H, the change in the position of the electron beams by the change in the high voltage does not occur. The construction of the control circuit, of course, is not limited to the particular illustration but any other design may be employed.

In this instance, the arrangement is such that when all of the electromagnetic deflections by the external current are stopped the electron beams impinge on positions outside the targets 22R, 22G and 22B. It should be understood that the distance from the above impinging positions to the centers of the targets 22R, 22G and 22B are advantageously shorter considering the easiness of the correction. In order to minimize the above distances, the beams may be shifted from the centers of the targets 22R, 22G and 22B past the longer sides thereof.

As an alternative, a structure as shown in FIG. 9 may be used as the projecting system. In this instance, a front glass 42 of a valve 41 is discretely coated by phosphors 43R, 43G and 43B for emitting three primary colors, i.e., red, green and blue, and a raster is scanned in the phosphors 43R, 43G and 43B by a common deflector 44, and the resultant images are projected through lens systems 45R, 45G and 45B for respective colors. With this arrangement a similar effect is obtained. In this embodiment, again, the coating arrangement of the phosphors 43R, 43C and 43B and the arrangement of the electron guns 46R, 46G and 46B may be either delta type or in-line type.

Figure 24:
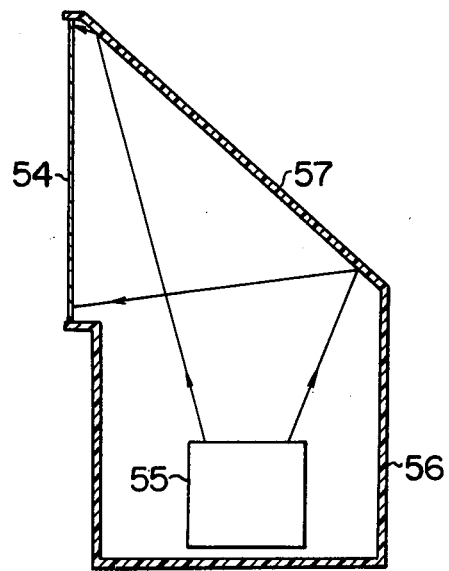
FIG. 24 shows a partial cross sectional view of a projecting system encased in a cabinet in accordance with another embodiment of the present invention.

Furthermore, as shown in FIG. 24, the television image projecting system 55 constructed as described in the foregoing may be encased in a cabinet 56, and a transmitting type screen 54 and a mirror 57 may be integrated to the cabinet 56. Thus, it is very advantageous to achieve an easily operable and compact projection system as a whole.

What is claimed is:

1. A television image projecting system comprising a plurality of projector systems and a cathode ray tube, each of said projector systems including:
   a phosphor target at one end of said cathode ray tube for displaying a television image thereon,
   an electron gun at the other end of said cathode ray tube for radiating an electron beam onto said phosphor target, and
   a Schmidt optical system arranged at the rear of said target and having at least a spherical mirror for projecting the television image on said phosphor target onto a screen located at a distance from said television image projecting system,
   all of said phosphor targets, electron guns and spherical mirrors of said plurality of projectors being accommodated in said single common cathode ray tube.

2. A television image projecting system according to claim 1 further including a common deflector which simultaneously deflects the electron beams of said plurality of projector systems.

3. A television image projecting system according to claim 2 wherein the electron guns of said projector systems are arranged and oriented such that when the operation of all of the deflection means to said electron beams stops all of the electron beams from the electron guns of said projector systems are radiated onto centers of said phosphor targets of said projector systems.

4. A television image projecting system according to claim 2 wherein the electron guns of said projector systems are arranged and oriented such that when the operation of all of the deflection means to said electron beams stops, all of the electron beams from the electron guns of said projector systems are radiated on positions displaced by the same distance in the same distance in the same direction from respective phosphor targets, and which further comprises correction means for causing electromagnetically said electron beams to impinge onto said phosphor targets.

5. A television image projecting system according to claim 4 further including means for controlling said correction means in response to a correction current, the magnitude of which changes in accordance with the change in the electron beam accelerating high voltage for suppressing the shift of the television images on said phosphor targets.

6. A television image projecting system according to claim 1 wherein said projector systems are arranged closely to each other such that said spherical reflecting mirrors of said projector systems partially overlap with each other and the overlapped portions are removed.

7. A television image projecting system according to claim 6 further including shield plates mounted at the boundaries of the spherical reflecting mirrors of adjacent projector systems to interrupt light therebetween.

8. A television image projecting system according to claim 6 wherein said sperical reflecting mirrors are partially removed such that the contour of said spherical reflecting mirrors and the arrangement of said spherical reflecting mirrors and said phosphor targets are analogous for all of said projector systems.

9. A television image projecting system according to claim 6 wherein those portions of the spherical reflecting mirrors which face shorter sides of said phosphor targets of said projector systems are removed.

10. A television image projecting system according to claim 6 wherein those portions of said spherical reflecting mirrors which face shorter sides of said phosphor targets of said projector systems are removed, and said spherical reflecting mirrors of adjacent projector systems are in-line arranged such that the removed edges are disposed side by side.

11. A television image projecting system according to claim 6 further including a common deflector which simultaneously deflects the electron beams of said plurality of projector systems.

12. A television image projecting system according to claim 6 wherein those portions of said spherical reflecting mirrors which face shorter sides of said phosphor targets of said projector systems are removed, and a deflector which commonly deflects the electron beams of said plurality of projecting systems is provided.

13. A television image projecting system according to claim 6 wherein those portions of said spherical reflecting mirrors which face shorter side of said phosphor targets of said projector systems are removed, the spherical reflecting mirrors of adjacent projector systems are in-line arranged such that the removed edges are disposed side by side, and a deflection means for commonly deflecting said electron beams of said plurality of projector systems is provided.

14. A television image projecting system according to claim 1 wherein said phosphor targets and said spherical reflecting mirrors of said plurality of projector systems are in-line arranged on one plane.

15. A television image projecting system according to claim 14 wherein said electron guns of said plurality of projector systems are in-line arranged on a plane which is orthogonal to a plane on which said phosphor targets and said spherical reflecting mirrors are arranged.

16. A television image projecting system according to claim 14 further including a deflector means for commonly deflecting the electron beams of said plurality of projector systems.

17. A television image projection system according to claim 1 wherein said plurality of projector systems are arranged such that all of the projecting optical axes thereof are parallel, and which further comprises means for shifting the positions of the television images on said phosphor targets to superimpose the television images of the projector systems on said screen.

18. A television image projecting system according to claim 17 wherein said projector systems are arranged closely to each other such that the spherical reflecting mirrors of adjacent projector systems partially overlap each other, and the overlapped portions of the spherical reflecting mirror are removed.

19. A television image projecting system according to claim 17 further including a common deflection means for simultaneously deflecting the electron beams of said plurality of projector systems.

20. A television image projecting system according to claim 17 wherein said phosphor targets and said spherical reflecting mirrors of said plurality of projector systems are in-line arranged on one plane.

* * * * *